May 27, 1941. A. J. LIEBENBERG 2,243,349
SYSTEM OF ELECTRIC CONTROL
Filed May 15, 1939 3 Sheets-Sheet 2
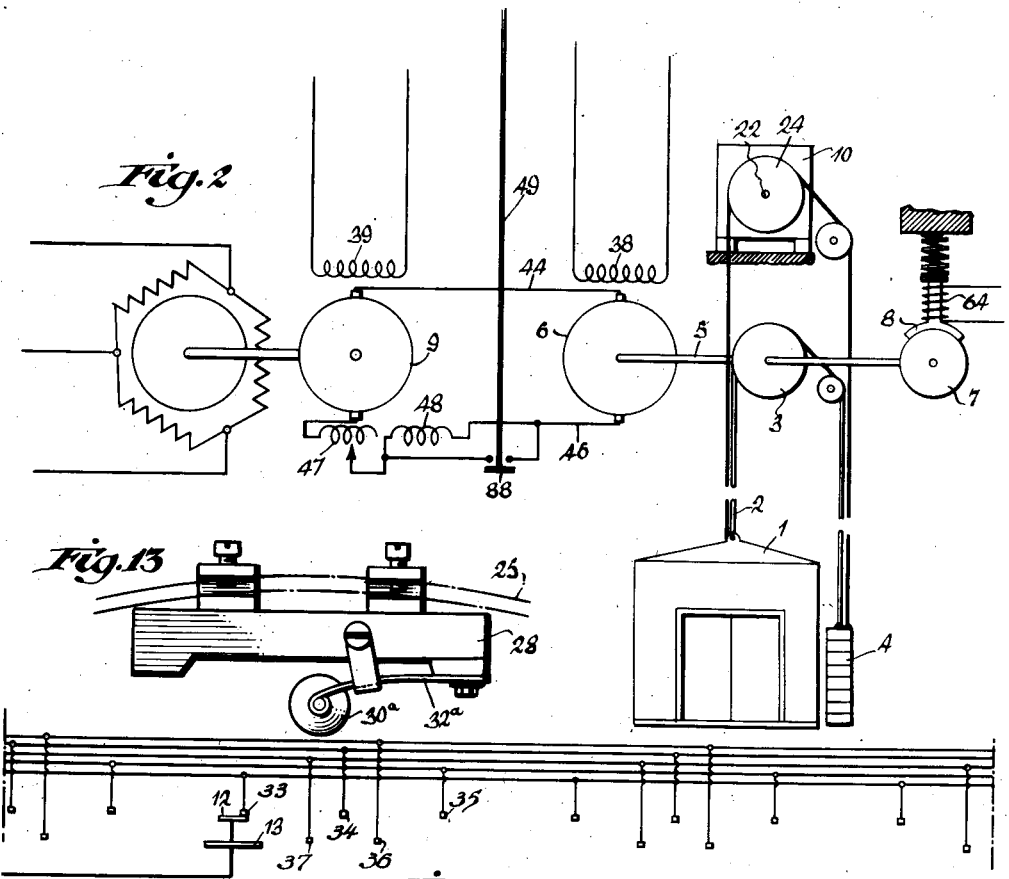
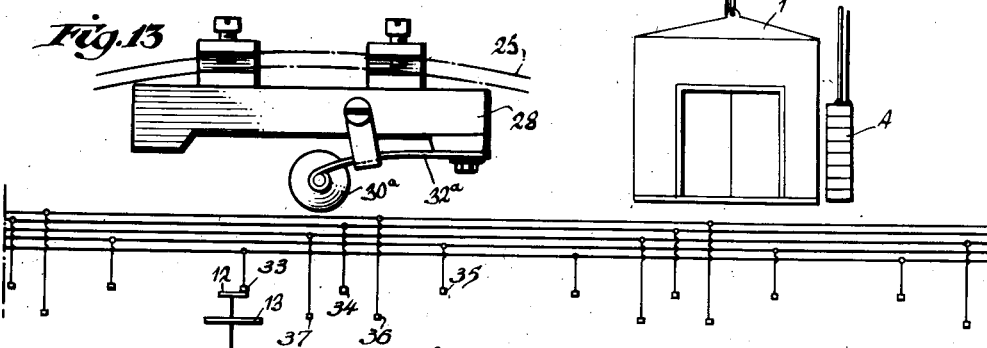
 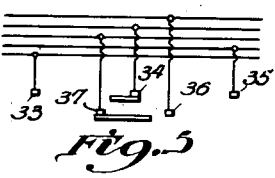 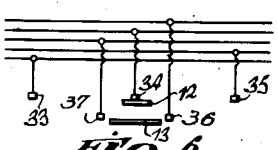
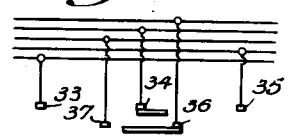 
INVENTOR.
Arthur J. Liebenberg
BY
Oliver B. Kaiser
ATTORNEY.

May 27, 1941.   A. J. LIEBENBERG   2,243,349
SYSTEM OF ELECTRIC CONTROL
Filed May 15, 1939   3 Sheets-Sheet 3

INVENTOR.
Arthur J. Liebenberg
BY
ATTORNEY.

Patented May 27, 1941

2,243,349

UNITED STATES PATENT OFFICE 2,243,349

SYSTEM OF ELEVATOR CONTROL

Arthur J. Liebenberg, Cincinnati, Ohio, assignor to The Warner Elevator Mfg. Company, Cincinnati, Ohio, a corporation of Ohio Application May 15, 1939, Serial No. 273,639

14 Claims. (Cl. 187—29)

This invention relates to control systems for elevators and the like, and more particularly to control means for accurately leveling the elevator car at the floor landings, and effective for a landing control when the elevator travels at high speed in making floor to floor stops, which in elevator parlance is designated as a "flying stop." For this class of installation when a manually operated switch, positioned in the elevator car, is employed for starting and stopping control, it is necessary for the operator to decide when to slow down when he desires to stop at the next floor, and which should be at a time at which the car reaches a definite distance from the floor landing so as to slow down smoothly and accurately. Should the operator move the control lever to neutral or stopping position in advance of reaching the determined distance from the floor landing, the car will slow down to "flying stop" speed and produce an effect of dragging the car to the floor landing. This occasions a loss of time when traveling from floor to floor.

The present improvement contemplates an operator control, enabling the operator to move the car switch to the full "on" position and as soon as the car is moving, return the switch to its neutral or central position, whereupon the car automatically accelerates until the highest speed is obtained for a one floor travel. As soon as the car arrives at a definite point or distance from the next floor landing from which a car slowing speed should occur, the speed of the car will automatically slow down and the car come to rest accurately at the floor landing.

The invention provides a very reliable and definite automatic control for decelerating the elevator car, within a prescribed distance from the floor at which the car stop is to be made, from a high speed to step by step controlled lower speeds, smoothly and without discomfort to the passengers, to accommodate for the shortest time for floor to floor stop travel, and to come to a stop level with the floor or within a small fraction of an inch tolerance above and below.

An object of the invention is to provide an automatic car speed decelerating and stopping control for elevators effective after the operator has manually started the elevator at one floor for the next, which will permit the operator at random, almost immediately after the car leaves the floor, to shift the controller lever to a central or off position, to his relief in skill and judgment in effecting a control for initiating deceleration at appropriate distances from the next floor, and for stopping.

Other objects and further advantages will be more fully set forth in a description of the accompanying drawings, in which:

Figure 2 is a diagrammatic representation of an elevator, driving motor, and automatic car stopping and floor leveling controller in transmitting connection with the car.

Figures 3 to 8, inclusive, are diagrammatic views showing details of operation.

Figure 9:
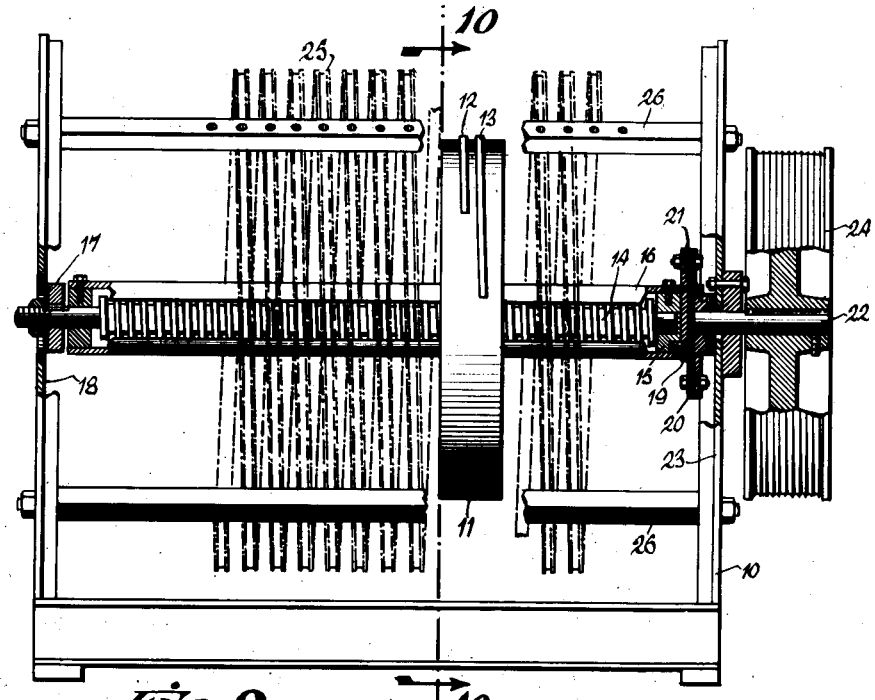

Figure 9 is a side elevation, partly in section, of the improved controller for elevator car automatic stopping and floor or landing leveling.

Figures 10, 12:
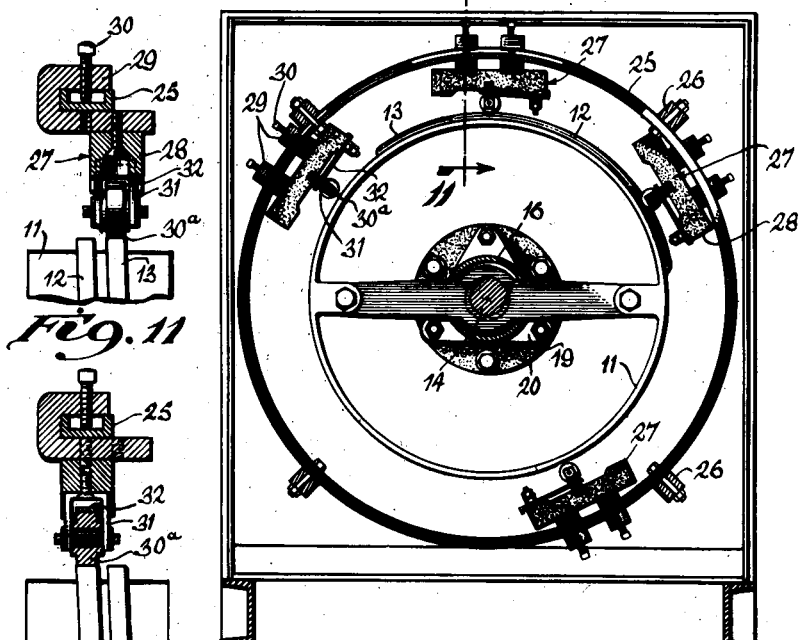

Figure 10 is a section on line 10—10, Figure 9.

Figure 11:
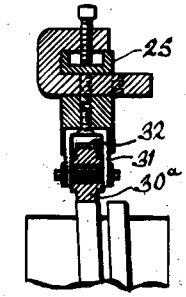

Figure 11 is an enlarged section on line 11—11, Figure 10.

Figure 12 is a view similar to Figure 11, showing the contactor in a second position of adjustment.

Figure 13 is a modified form of stationary contact for the elevator car operated controller.

Referring to the drawings, in the specific embodiment shown, 1 indicates an elevator car which is raised and lowered in a conventional manner, as by a cable 2, wound about a winding drum or spirally grooved sheave 3. One end of the cable from the winding drum is fixed to the car and the other end from the drum suspendingly carries a counterweight 4. The winding drum is fixed upon a shaft 5, connecting with a main driving electric motor 6. The drum driving shaft 5 also carries a brake drum 7, which cooperates with an electrically operated or controlled brake shoe 8.

The motor 6 is of direct current type supplied from a generator 9 of a conventional variable voltage motor generator set having damping and series windings to secure smooth and accurate results.

In the diagrammatic views, many of the parts and electric circuit lines as would be included in a complete elevator installation have been omitted to avoid incumbering the disclosure and description with portions more or less irrelevant to present improvement. Various control devices are provided for the armature circuits of the generator etc., of a generator set, of the conventional variable voltage type well understood in the art in order to properly accelerate the elevator car, to decelerate it and level it at a floor.

The automatic elevator car speed, stopping and floor leveling controller, to which the present improvement is particularly directed, is shown in detail Figures 9 to 11 inclusive, and for an elevator installation is usually located in the pent house along with the elevator winding drum. The controller comprises a frame 10 of open or skeleton form to expose and render easily accessible the electric switches or contactors of the number required for each floor, to offer convenience in making whatever adjustment thereof that may be required to accurately relatively arrange the same for the floor control of the car and for the number of floors served.

The controller is equipped with a revolving and translatable electric circuit controlling drum 11 having on its periphery a plurality of relatively different length contact segments or lobes 12, 13. These segments longitudinally are in parallel arrangement and each is representative of a section of a tooth of a screw, adapted at and for definite periods to complete an electric circuit when engaged by a relatively stationary contactor during a revolution of the drum. The segments, preferably are removably mounted upon the drum for replacement and adjustment. The drum is axially traversed in alternated directions, the direction depending upon the direction of travel of the elevator car in its ascent or descent in the elevator hatchway. The contact drum is mounted upon and in threaded engagement with the threads of a relatively stationary screw 14. The screw 14 causes the drum to be translated proportional to the length of elevator car travel in the hatchway so as to be effective for each of the number of floors served.

One end of the screw 14 is sustained within a collar 15 fixed within one end of longitudinally slotted sleeve 16 concentric about the screw. The sleeve longitudinally is diametrically slotted, providing parallel openings through which the spider arms of the drum extend to permit axial travel of the drum upon the sleeve and rotatively couple the drum to the sleeve. The opposite end of the screw extends through a collar fixed in a corresponding end of the sleeve 16 and through a support or bracket 17 fixed to and insulated from the end wall 18 of the frame 10. The screw is keyed to the bracket to hold the same against rotation.

The sleeve 16, at one end, has a coupling flange 19 fixed thereto and to an insulator plate 20 fixed to a coupling flange 21 secured upon one end of a driving shaft 22 journalled in the end wall 23 of the frame 10. The shaft 22 carries and has keyed thereto a cable drum 24 spirally grooved for transmittingly receiving a cable connecting with the elevator car and counterweight so that the cable drum is rotated with the travel of the elevator car and in a direction corresponding thereto.

The drum 11, screw 14, and coupling sleeve 16, as a unit is insulated from the frame and its driving means for the purpose of electric current conduction, which, however, is merely selected for hook-up simplification as it is obvious that the unit could serve solely as an actuator for electric switches.

A spiral cage 25 concentrically encircles the contact drum and screw and is sustained by and fixed to a series of cross rods 26 at their opposite ends secured to the end walls 18 and 23 of the frame 10. The cage is fabricated from a strip of channel iron and the convolutions are in approximate registry with the path of the contact segments 12 and 13 of the contact drum 11, adapting the segments to be appropriately contacted by stationary contactors 27 sequentially mounted upon the cage at a determined spacing apart. The stationary contactors during the rotation of the drum and at timed intervals in the travel of the car toward a succeeding floor, function to permit the operator to move the manual car control switch to a central or car stopping position, after starting, for stopping at a next succeeding floor, automatically controlling motor speed acceleration, followed by a reduction of motor speed to a determined low value when the car is a predetermined distance from the landing and to stop the motor when the car is level with the landing floor.

A set of five stationary contactors 27, for cooperation with the contact drum, are employed for each of the intermediate landings and a set of four stationary contactors for each of the terminal landings. Preferably each stationary contactor comprises an insulator block 28, fixed to a limb of each of a pair of yoke-shaped clamps 29 transversely clipped upon the cage and rigidly fixed thereto by a binding screw 30. By employing a pair of clamps the contactor is more securely mounted upon the cage and with less opportunity for its setting to be disturbed in a long period of operation. A contact roller 30a is loosely journalled within a saddle 31 rigidly secured upon the underside of the insulator block 28. The periphery of the roller is engaged by a flexible metal conductor strip 32 mounted upon the underside of the insulator block 28. The roller is set to bear and ride upon a respective segment of the contactor drum for establishing and controlling an electric circuit for a definite period governed by the length of the segment and rate of rotation of the drum. As shown in Figures 11 and 12 the insulator block 28 can be set to either one of two locations upon the clamps, to position the roller for cooperation with either of the contact segments 12 or 13.

In the modified form of stationary contactor, the roller 30a is journalled upon a stud shaft fixed within the free end of a flexible conductor strip 32a fixed to the lower end of the insulator block 28.

As soon as a roller comes in contact with a drum segment, a control circuit is established and maintained until the roller rides off at one end of the segment. The control segments relatively are of different length and are permanently located upon the drum while the stationary contacts are adjustable upon the cage permitting a delicate adjustment to be readily made to obtain accurate results.

Figure 3 illustrates in a diagrammatic plan the sequential position of the stationary contacts for two intermediate floors and a portion for each of the terminal floors. In this view the drum segments are in an arbitrary location with the short segment 12 cooperating with one of the series of stationary contacts as an end one thereof, effective in a down or return direction of elevator car travel. For each intermediate floor there are three stationary contacts 33, 34 and 35 in a successive position to contact with the short segment 12, and two stationary contacts 36 and 37 in a line to cooperate with the long segment 13. When the elevator car is at rest at a floor landing, the long segment 13 is in an intermediate position between the stationary contacts 36 and 37 as illustrated in a diagrammatic plan Figure 6, while the short segment 12 cooperates with the stationary contact 34 as intermediate of its companion contacts 33 and 35. Contact 33 is utilized in a down direction, and 35 in an up direction of car travel. For the terminal floors, either contact 33 for the down travel or 35 for up travel are omitted. Therefore, assuming that the elevator car is standing at the first or ground or at any of the floors served, the segments are in a position corresponding to that illustrated in Figure 6 with the long segment 13 neutral and the short segment 12 contacted with the intermediate stationary contact 34 of the floor series.

Upon starting the car in an up direction, and as soon as the short segment contacts with the stationary contact 35, which would correspond to a position shown in Figure 8, the point for applying stop speed control would be reached and a circuit control established for automatically decelerating the car within a determined distance for the next succeeding floor. When that period commences, the segments are in a position as shown in Figure 4 with the short segment 12 neutral and the long segment 13 contacted by the stationary contact 36 for a high speed leveling. Upon reaching the high leveling speed, the short segment 12 is contacted by the stationary contact 34 for a low leveling speed. As soon as the elevator car reaches a point at which the long segment 13 will have passed free from the stationary contact 36, all direction switches will be neutralized, the brake will be set, and the car stopped level with the floor.

This same procedure takes place for each floor landing in making the floor stops for either up or down direction of car travel, with separate stationary contacts distinctive for up and down direction of car travel. For a floor to floor stop the car will, upon starting, travel at an accelerated or high speed for a predetermined distance from the next floor landing, then within a definite distance from the floor landing decelerate for a given period which is followed by a further deceleration to reduce the speed of the motor to an appropriate low leveling speed. This provides for a comparatively high speed or maximum travel rate for the full distance, the speed rate tapering down toward a floor approach smoothly and without jar, and which will bring the car to a stop level with the floor landing. Should the operator however be late in shifting the control switch to a central or neutral position, as when being within too short a distance from the floor, the car will continue to travel at high speed, passing the floor at which the stop was intended and continue until the floor speed regulating zone is reached for the next floor, whereupon the car will automatically slow down and stop.

If however it is absolutely necessary for the operator to make the stop under automatic regulation, the automatic control can be rendered ineffective by the operator throwing the car switch for a control in an opposite direction which will immediately clear the control circuits from all sealing in or holding circuits.

The pitch of the screw and the diameter of the driving sheave provides for an appropriate transmission reduction to translate the contact drum at a reduced degree proportionate to the length of car travel for the distances from floor to floor. It is obvious that stationary contacts can be located in the elevator hatchway, and the equivalent of the long and short segments of the drum attached or applied to the elevator for producing the same results, although a material advantage is obtained by centralizing the control apparatus.

Figure 1:
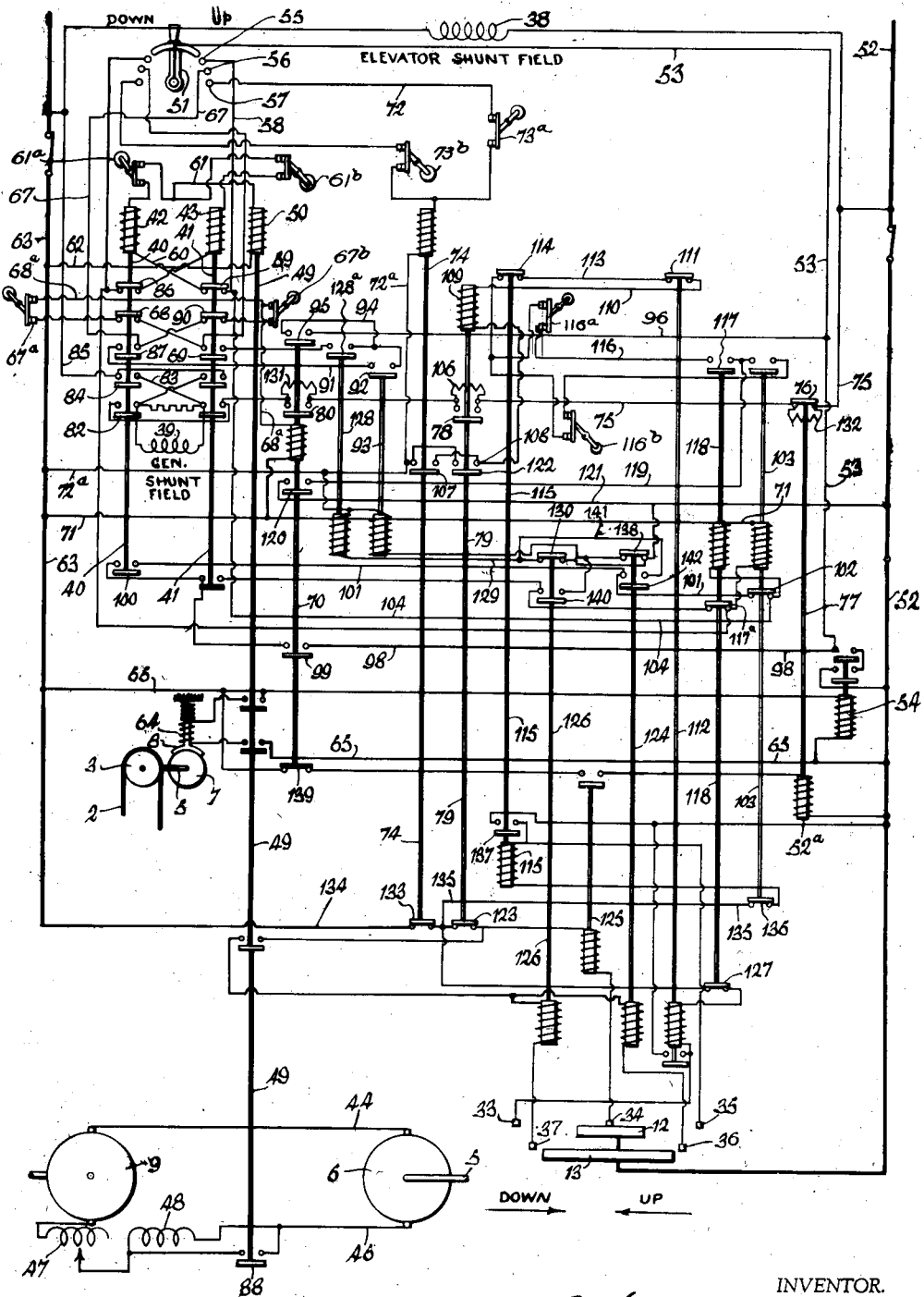
Figure 1 is a diagrammatic representation of a system of elevator control embodying my invention.

The schematic diagram Figure 1 has been reduced to the simplest possible form, omitting all parts and apparatus of a complete elevator control system which are not directly associated with the present improvement, and which would tend to confuse rather than to clarify the explanation.

The elevator driving motor 6 is of a direct current type having its armature supplied from a variable voltage generator 9 which is driven substantially constant and generally by an electric motor of alternating current type, which in turn is supplied from any suitable source. The direct current motor 6 is provided with suitable field winding 38, and likewise generator 9 is provided with a separately excited field winding 39.

The starting, stopping, and direction of rotation of the motor 6 is controlled by controlling the direction and energization of the separately excited field winding 39 of the generator, the control being by means of reversing switches 40, 41, operated respectively by the coils 42, 43. The generator and elevator motor are connected by a permanent connection or conductor 44 and a conductor 46 including a series winding 47 for the generator and an auxiliary series winding 48. The auxiliary series winding 48 is controlled by a relay 49 operated by a coil 50 which is in series with the coils 42, 43. The relay 49 also controls the circuit to an electric brake for the elevator transmission.

Having now described in detail the major part and apparatus employed, it is believed that a more comprehensive understanding of the invention will be facilitated by including the construction and arrangement of the various parts, namely, that of relay switches, by a description of the system in a mode of operation. The relay switches are or may be of conventional or well known type of construction, as commonly employed for elevator automatic control installations.

Assuming that the elevator is to be started in an upward direction, the manually operated control car switch lever 51 is shifted from its off or central neutral position to the right. The lever 51, as an electric conductor member, is electrically connected to a supply line 52 by a conductor 53. The conductor is controlled by a relay switch 54 having its coil connected in series with hatchway door switches and car door switches as a safety measure to prevent elevator car operation when the coil is deenergized. When the switch lever 51 is shifted to the right, it engages three starting contacts 55, 56, and 57. Upon engaging with contact 55, a circuit is established from the main supply line 52 through the conductor 53, switch lever 51, conductor 58, a relay switch member 59 actuated by the reversing switch 41, closed as shown in Figure 1, when the coil 43 of the reversing switch 41 is open or deenergized.

The circuit therefore is completed to the coil 42 of the reversing switch 40 through a conductor 60 and a conductor 61 in series with the coil 50 of the relay switch 49, and the conductor 62 in connection with the supply line 63. The conductor 61 includes car limit switches 61ª and 61ᵇ. Thus, simultaneously upon energizing the coil 42 of the reversing switch 40, the coil 50 of the relay switch 49 is energized, which establishes a circuit for the coil 64 of the elevator brake apparatus having a brake shoe cooperating with a brake drum 7. The brake coil 64 connects with a conductor 65 in connection with a supply line 52, and includes a switch member operated by the relay switch 49 and by a conductor 66 connecting with the supply line 63 likewise including a switch member operated by the relay switch 49. The brake is therefore immediately released upon starting the car in either up or down direction.

Upon the switch 51 contacting or connecting with the contact 56 of the car switch, a circuit is established from the car switch 51, contact 56, conductor 67, connecting with a stationary contact of the reversing switch 40, thence on a bias to a stationary contact of reversing switch 41, thence through the switch member 90 of the reversing switch 41, conductor 68$^a$, including up and down high leveling speed hatchway limit switches 67$^a$ and 67$^b$ to the coil of relay switch 70, and from the coil by a conductor 71 to the supply line 63. The coil of the relay switch 70 is initially energized upon moving the car switch 51 to an active or "on" position for either up and down direction, and when energized the relay establishes its own self-sealing circuit, so that the coil remains energized upon moving the car switch to its intermediate or "off" position.

The third contact 57 of the car switch connects by a conductor 72 to high speed hatchway limit switches 73$^a$ and 73$^b$ and the coil of a relay switch 74, which in turn connects with a conductor 72$^a$ to the supply line 63.

When the coil 42 of the reversing direction switch 40 is energized, it causes a generator shunt or exciting field winding 39 to be energized for accelerating the car driving motor speed. The circuit for the generator winding field is as follows: starting at the feed line 52 through conductor 75 switch element 76 of a relay switch 77, switch element 78 of a relay switch 79 when in an active position, its control circuit hereinafter described, switch element 80 of the relay switch 70, thence through switch element 82 of the reversing direction switch 40 through the generator shunt or exciting field winding 39, from the field winding 39 by a cross conductor 83 with a switch element 84 of the reversing direction switch 40, and thence by a conductor 85 to the feed line 63.

The relay switch 77 is controlled by another relay switch, and introduces resistance in series with the generator field winding 39 at the proper time to cause the elevator motor to operate at its lowest leveling or landing speed. It also controls the generator damping field when employed and power driven door operating apparatus.

The relay switch 79 also controls resistance which is placed in series with the generator shunt field winding for motor speed deceleration. Likewise relay 70 controls resistance which is placed in series with the generator shunt field winding.

The reversing direction switch 40 when energized opens the switch element 86 which normally establishes a circuit to the coil 43 of the down direction reversing switch 41 for interlocking purposes. The upward direction reversing switch 40 when energized closes a contact element 87 for partially maintaining a sealing circuit for the high leveling speed relay switch 70. The sealing circuit for the coil of relay 70 is completed through the normally closed switch element of an interlocking relay, which in turn is controlled by the car leveling controller as hereinafter described. The relay switch 49, which controls the brake circuit, also carries a contact element 88 for controlling the generator auxiliary series winding. When the stopping control for the driving motor has been effected, relay 49 is deenergized, opening its contact element 88. This introduces an auxiliary series winding in the generator armature circuit, counteracting a circulating current, which, if allowed to exist after the motor has been controlled for stopping, may attain such value as to cause the motor to turn slowly moving the car slowly away from the floor or landing, creating a hazard.

The relay switch 70 controlling the high leveling speed, or preliminary decelerating car motor speed for stopping when energized, closes a sealing or self-energizing circuit. The circuit leads from the feed line 63 through conductor 71, coil of the relay switch 70, conductor 68$^a$ to a stationary contact for contact member 90 of reversing switch 41, and then bias over to a stationary contact for the switch member 87 of the reversing switch 49, thence through switch member 87, continuing from switch member 87 by a conductor 91 to a switch element 92 of a relay switch 93, thence by a conductor 94 to the switch member 95 of the relay switch 70 and conductor 96 which connects with the conductor 53 to the feed line 52 controlled by the relay switch 54. The relay 93 acts as an interlock for the relay 70 and is normally held in closed position by a circuit established from the supply line 63, line 72$^a$ through the coil of relay 93, the circuit from this point being completed through the supply line 52 through the switch element of a relay controlled by the car leveling controller as hereinafter described. When the coil of the relay switch 70 is energized, it closes a switch member 80 carried by the relay switch 70 shorting out resistance 131 which is in series with the generator shunt field winding 39. The resistance is shown as interposed in the conductor 75.

A sealing circuit for the reversing switch 40 is also closed through the switch member 59 of the reversing switch 41, starting at the feed line 52 through the movable switch member of relay switch 54, thence by conductor 98 through the switch member 99 carried by the relay switch 70, to and through the switch member 100 of reversing switch 40, from the switch member 100 by a conductor 101 to a switch member 102 of the relay switch 103. Thence through said switch member 102 and by a conductor 104 through switch member 59 of reversing switch 41, which, when open or deenergized, closes said switch member 59, then continuing on a bias to the coil 42 of the reversing switch 40, conductor 61, coil 50 of relay switch 49, conductor 62, through the feed line 63.

The relay switch 74 acts to initiate the relay switch 79 controlling resistance 106 through switch member 78. The resistance when in series with shunt field winding of the generator effects the motor deceleration.

The circuit for the coil of the relay switch 79 is as follows: starting from the feed line 63 by conductor 72$^a$ through the switch member 107 of the relay switch 74, thence by conductor 108 through the coil 109 of the relay switch 79, conductor 110, switch member 111 of the relay switch 112, conductor 113, switch member 114 of the relay 115 from said switch member 114 through conductor 116, through the switch member 117 of a relay switch 118, thence by conductor 119 to a switch member 120 of relay switch 70, and thence by a conductor 121 to the feed line 52. The branch conductors 116 include limit switches 116ª and 116ᵇ for up and down directions respectively.

The relay switches 103 and 118 serve for interlock, and control the high speed variable voltage relay switch 79. Relay switch 115 operates in conjunction with the stationary contact 35 of the automatic stopping controller, causing the car to slow down to the flying stop speed at the proper time in an up direction. Relay 112 performs the same function as relay 115 only for the opposite or down direction, and therefore has its circuit in connection with the stationary contact 33 of the automatic controller.

When the coil of relay switch 79 is energized, it closes a self-sealing circuit through a switch member 122, in parallel with the switch member 107 of the relay switch 74. The switch member 78 closes with the member 122 of the relay 79 which shorts or cuts out the resistance 106, which is in series with the generator shunt field winding. Upon closing, switch members 78 and 122 of relay 79, a switch member 123 is opened, breaking the circuit to the relays 124, 125, and 126 of the automatic stopping controller.

Relay 118 is connected parallel to the coil 42 of reversing switch 40 and coil 50 of relay switch 49, and interlock contact member 59 of the reversing switch 41. When the coil of relay 118 is energized, it closes switch member 117 which is in series circuit with the coil of relay 79. Contact member 117ª of relay 118 interlocks down direction reversing switch 41 and the relays 49 and 103, and the contact member 127 of relay 118 interlocks down direction flying stop relay 112.

Relays 128 and 93 act as interlocks for high leveling relay 70. The coil for the relay 128 when energized has the following circuit: starting with the feed line 63, conductor 72ª to the coil of relay 128 from the coil to conductor 129, switch member 130 of relay 126, and thence to the feed line 52 by connection with the conductor 121. The switch member 128ª of the relay 128 interlocks the down direction control circuit for relay 70. The coil of relay 93 is energized through the following circuit: starting with the feed line 63, conductor 72ª, through the coil of relay 93 to the normally closed switch element 138 of relay 124 and by way of line 121 to the feed line 52. The switch member 92 of relay 93 interlocks the up direction control circuit for the relay 70.

When the car switch 51 is shifted to its full on position, reversing relay 40 and relays 49, 118, 128, 74, 79, 70, 54, and 93 are energized. The elevator motor will operate the car at high speed due to the resistance 106 controlled by relay 79, resistance 131 controlled by relay 70, and resistance 132 controlled by relay 77, which are cut out applying full voltage to the generator shunt field. The operator after the car has moved from the floor toward the next succeeding floor at which a stop is to be made, moves the car switch to an off or central position. This also applies whether the car leaves or passes said lower floor in an up direction, whereupon the automatic speed and stopping control becomes effective, at and within the appropriate periods gauged upon determined distances from the next succeeding floor at which the stop is to be made. Moving the car switch to off position causes relay 74 to be deenergized, closing its switch member 133 establishing a feed line circuit through conductor 134 connecting with the feed line 63, through conductor 135 to the switch member 136 of relay 103; from the switch member 136 continuing to the coil of relay 115, thence to the stationary contact 35 of the automatic car controlling speed and stopping apparatus. The segments 12 and 13 are in conductor connection with the feed line 52.

The car continues to travel at high speed until the movable (short) contact segment 12 upon the rotating drum contacts with the stationary contact 35. This energizes the coil of relay 115 which closes a sealing circuit for itself from the feed line 52 through a switch member 137 actuated by said relay 115, thence through the coil of relay 115 and conductors 135, 134, to the feed line 63. It is necessary that the relay 115 seal itself due to the advance of the segment 12 and its separation from the stationary contact 35. Upon energizing the coil of relay 115, it moves the switch member 114 thereof to open position which deenergizes the coil of relay 79.

Relay 79, when deenergized, moves its switch member 78 to off position which introduces resistance 106 into the generator shunt field winding, causing the elevator driving motor to decelerate or slow down to a fly stop speed.

Interlock switch member 123 of relay 79 is also closed, which completes a partial circuit to the coils of relays 124, 125, and 126, so that they can be energized at the proper time in the approach of the car to the next floor at which a stop is to be made.

After the elevator driving motor has decelerated to fly stop speed, the movable (long) contact segment 13 of the automatic elevator motor speed controlling and stopping apparatus will contact with the stationary contact 36 which energizes the coil of relay 124. Energizing the coil of relay 124 opens its switch member 138, causing the relay 93 to become deenergized, opening its switch member 92 cutting out the high leveling speed relay 70. Upon deenergizing, relay 70 opens its switch member 80, cutting in resistance 131 in the generator, shunt field winding causing the elevator driving motor to further decelerate to what is termed a high leveling speed.

When the coil of relay 70 is deenergized, the switch member 99 thereof is opened for breaking the sealing circuit for the coils of the reversing switch 40 and relays 49 and 118. When relay 124 becomes active, it closes its switch member 142, which establishes a holding circuit for the reversing switch 40 and relays 49 and 118.

The circuit thus established is as follows: starting at feed line 52 through the conductor 121, which branches to the switch member 130 of relay 126, thence through said switch member 130, conductor 141, switch member 142 of relay 124, conductor 101, to switch member 102 of relay 103, and thence through the coil of relay 118 to conductor 71, and also through switch member 102 of relay 103, through conductor 104 to the coil of reversing switch 40 and relay 49 to the feed line 63.

After the car has slowed down to high leveling speed, the movable (short) contact segment 12 engages with the stationary contact 34, causing the coil of relay 125 to become energized, which through its switch member completes a circuit for the coil of relay 77. Upon the coil of the relay 77 becoming energized, it opens its switch member 76, introducing resistance 132 in the generator shunt field winding, causing the elevator motor to be further decelerated or reduced to its lowest leveling and landing speed. When the car is at the proper floor level, the movable (long) contact segment 13 breaks the circuit of the stationary contact 36, deenergizing coil of relay 124 which opens the holding circuit to the coils of reversing switch 40, and relays 49 and 118, for a car stop.

In summary, after leaving a floor for the next floor stop, in an up direction, the operation of the circuit is as follows. The drum contact segment 12 contacts with a stationary contact 35 to energized relay 115, whereupon relay 79 will be released. A sealing circuit to the relay 115 at the same time is effected, allowing the travel to continue at high speed as the segment 12 will run off the contact 35. Upon energizing the relay 115, relay 79 is deenergized, cutting in resistance 100, for the first change or reduction in the car traveling speed. The segment 13 upon engaging with a contact 36 for the next floor at which the stop is to be made energizes relay 124. This causes relay 93 to become deenergized, which in turn deenergizes relay 79 cutting in resistance 131. It then follows that the segment 12 contacts with stationary contact 34, energizing relay 125, energizing relay 77 to cut in the resistance 132 for the minimum speed. Upon the segment 13 releasing its contact with the stationary contact 36, relay 124 will be deenergized which opens the holding circuit for the reversing switch 40, and relays 49 and 118 bringing the car to a stop.

The control for the car in a down direction is the same as for up, in which instance stationary contact 33 of the car driven controller, relay 112, stationary contact 37 of the car driven controller, and relay 126 substitute for the stationary contact 35, relay 115, stationary contact 36 and relay 124.

Having described my invention, I claim:

1. A control system for elevators and the like, comprising, a car, electric driving means for said car, reversing switches for controlling said driving means, resistances in a circuit with said driving means for controlling the acceleration and deceleration of said driving means, electro-magnetically operated control switches for controlling said resistances, a manually operated car switch for controlling said reversing and control switches to start and accelerate the car, electro-magnetically operated control switches for controlling said reversing and resistance control switches after the car has started, and a car operated switch for sequentially controlling the circuits to said second electro-magnetically operated control switches to control said resistances in steps at determined distances of car travel from a floor stop to decelerate the car and finally to control said reversing and resistance control switches to bring the car to a stop at the floor level.

2. A control system for elevators and the like, comprising, a car, electric driving means for said car, reversing switches for controlling said driving means, electro-magnetically operated means for controlling the acceleration and deceleration of said driving means, a manually operated car switch for initially controlling said reversing and electro-magnetically operated means to start and accelerate the car, electro-magnetically operated control switches for controlling said reversing switches and electro-magnetically operated means upon shifting said car switch to an off position after the car has started, and a car operated switch effective when the car switch is in an off position for sequentially controlling said second-electro-magnetically operated control switches and thereby said electro-magnetically operated means at determined distances of car travel from a floor stop to decelerate the driving means and to bring the car to a stop at the floor level.

3. A control system for elevators and the like, comprising, a car, electric driving means for said car, electro-magnetically operated reversing switches for controlling said driving means, and the acceleration and deceleration thereof, a manually operated car switch for initiating the control, said reversing switches to start in a selected direction and accelerate the car, electro-magnetically operated control switches for controlling said reversing switches after the car has started and the car switch shifted to an off position, and a car operated switch for sequentially controlling the circuits to said second electro-magnetically operated control switches to control said reversing switches to decelerate the driving means at determined distances of car travel from a floor stop and to bring the car to a stop at the floor level.

4. A control system for elevators and the like, comprising, a car, electric driving means for said car, electro-magnetically operated reversing and speed controlling switches for said driving means, a manually operated car switch for the control, said reversing and speed controlling switches initiated to start the driving means in a selected direction and acceleration, electro-magnetically operated control switches for controlling said reversing and speed controlling switches after the car has started and the car switch shifted to an off position, and a car operated switch for automatically sequentially controlling said electro-magnetically operated control switches to control said reversing and speed controlling switches to decelerate the driving means at determined distances of car travel from a floor stop and to bring the car to a stop at the floor level.

5. In an elevator system, a car, an electric motor for driving the car, means for controlling the speed of said motor, a manually operated car switch for actuating said speed controlling means to start the motor in a selected direction and acceleration, electric operated control switches for maintaining and governing said speed control means effective for an automatic speed changing and stopping control after the car is in motion for a successive floor, and cooperating movable and stationary contacts, the movable contacts operated by and in accordance with the movement of the car to render said electric operated control switches effective after starting the car driving motor and the car switch has been moved to an off position, the stationary contacts for each floor and car direction control in a sequential order, thereby initiating deceleration of the motor when the car is in a predetermined distance from a landing and stopping the driving means when the car is at the level of a landing.

6. In an elevator system, a car, an electric motor for driving the car, means for controlling the speed of said motor, a manually operated car switch for actuating said speed controlling means to start the motor in a selected direction and acceleration, electric operated control switches for maintaining and governing said speed control means effective for an automatic speed changing and stopping control after the car is in motion for a successive floor, and cooperating movable and stationary contacts, the movable contacts operated in a spiral path by and in accordance with the movement of the car, and said stationary contacts sequentially arranged upon a spiral cage to render said electric operated control switches effective after starting the car driving motor and the car switch has been moved to an off position, thereby holding said motor control means active independent of said car switch to initiate automatic deceleration of the motor when the car is in a predetermined distance from a landing and to stop the driving means when the car is at the level of a landing.

7. In an elevator system, a car, an electric motor for driving the car, means for controlling the speed of said motor, a manually operated car switch for actuating said speed controlling means to start the motor in a selected direction and acceleration, electric operated control switches for maintaining and governing said speed control means effective for an automatic speed changing and stopping control after the car is in motion for a successive floor, and cooperating movable and stationary contacts, the movable contacts operated by and in accordance with the movement of the car and the stationary contacts sequentially arranged to render said electric operated control switch effective after starting the car driving motor and the car switch has been moved to an off position, to initiate deceleration of the motor when the car is in a predetermined distance from a landing, and to further reduce the speed of said motor at intervals upon initiation of motor speed deceleration, and to stop the driving means when the car is at the level of a landing.

8. In an elevator system, a car, an electric motor for driving the car, electro-magnetically operated directional switches for controlling the direction and operation of said motor, an energizing circuit for said directional switches, a manually operated car switch to establish said circuit, relays for establishing a holding circuit for said direction switches independently of said car switch, adapting the car switch to be moved to off position as soon as the motor has attained its driving speed upon the car leaving a floor for stopping at a next succeeding floor and in advance of the car reaching a determined distance from said succeeding floor, a controller operated by and in accordance with the moving car for establishing a holding circuit for said directional switches upon throwing said car switch to off position, resistances for controlling the deceleration and stopping of the motor, relays operative for controlling said resistances for decelerating the motor when the car is in a prescribed distance from a floor, and for stopping, the circuits for said relays established and controlled by said car operated controller.

9. In an elevator system, a car, an electric motor for driving the car, electro-magnetically operated directional switches for controlling the direction and operation of said motor, an energizing circuit for said directional switches, a manually operated car switch to establish said circuit, relays for establishing a holding circuit for said direction switches independently of said car switch, adapting the car switch to be moved to off position as soon as the motor has attained its driving speed upon the car leaving a floor for stopping at a next succeeding floor and in advance of the car reaching a determined distance from said succeeding floor, a controller operated by and in accordance with the moving car for establishing a holding circuit for said directional switches upon throwing said car switch to off position, means for sequentially controlling the deceleration and stopping of the motor, relays operative for controlling said means, the circuits for said relays sequentially established and controlled by said car operated controller, when the car is within prescribed distances from the floor and at the floor and to cut off the holding circuit for said direction switches when the car has stopped at the floor level.

10. In an elevator system, a car, an electric motor for driving the car, electro-magnetically operated directional switches for controlling the direction and operation of said motor, an energizing circuit for said directional switches, a manually operated car switch to establish the circuit, relays for establishing a holding circuit for said direction switches independently of said car switch, adapting the car switch to be moved to off position as soon as the motor has attained its driving speed upon the car leaving a floor for stopping at a next succeeding floor and in advance of the car reaching a determined distance from said succeeding floor, a controller operated by and in accordance with the moving car for establishing and controlling a holding circuit for said directional switches upon throwing said car switch to off position, resistances for controlling the deceleration and stopping of the motor, relays operative for controlling said resistances for decelerating the motor when the car is in a prescribed distance from a floor, and for stopping, the circuits for said relays established and controlled by said car operated controller.

11. In an elevator system, a car, an electric motor for driving the car, electro-magnetically operated directional switches for controlling the direction and operation of said motor, an energizing circuit for said directional switches, a manually operated car switch to establish the circuit, a controller operated by and in accordance with the moving car for establishing a holding circuit for said directional switches upon throwing said car switch to off position as soon as the motor has attained its driving speed upon the car leaving a floor for stopping at a next succeeding floor and in advance of the car reaching a determined distance from said succeeding floor, means for controlling the deceleration and stopping of the motor, relays operative for controlling said means for decelerating the motor when the car is in a prescribed distance from a floor, and for stopping, the circuits for said relays sequentially established and controlled by said car operated controller.

12. In an elevator system, a car, an electric motor for driving the car, electro-magnetically operated directional switches for controlling the direction and operation of said motor, an energizing circuit for said directional switches, a manually operated car switch to establish the circuit, a controller operated by and in accordance with the moving car for establishing a holding circuit for said directional switches upon throwing said car switch to off position as soon as the motor has attained its driving speed upon the car leaving a floor for stopping at a next succeeding floor and in advance of the car reaching a determined distance from said succeeding floor, means for controlling the deceleration and stopping of the motor, relays operative for controlling said means for decelerating the motor when the car is in a prescribed distance from a floor, and for stopping, the circuits for said relays sequentially established and controlled by said car operated controller, said car operated controller effective for controlling said directional switches, upon the car overrunning a floor level in stopping to reverse the motor for return of the car to floor level, and stopping the motor at the floor level.

13. In an elevator system, a car, an electric motor for driving the car, electro-magnetically operated directional switches for controlling the direction and operation of said motor, an energizing circuit for said directional switches, a manually operated car switch to establish the circuit, a controller operated by and in accordance with the moving car having a pair of differential length unitarily movable contacts respectively cooperating with relative stationary contacts selectively positioned for each floor for establishing a holding circuit for said directional switches upon throwing said car switch to off position as soon as the motor has attained its driving speed upon the car leaving a floor for stopping at a next succeeding floor and in advance of the car reaching a determined distance from said succeeding floor, means for controlling the deceleration and stopping of the motor, relays operative for controlling said means for decelerating the motor when the car is in a prescribed distance from a floor, and for stopping, the circuits for said relays sequentially established and controlled by said pair of movable contacts of the car operated controller, for car deceleration and subsequently for neutralizing said directional switches to stop the car at a floor, and normalizing the control apparatus.

14. In an elevator system, a car, an electric motor for driving the car, electro-magnetically operated direction switches for controlling the direction and operation of said motor, a manually operated car switch for establishing and maintaining an electric circuit with a selected one of said direction switches during the period it remains in an active position, relays for establishing a holding circuit for said direction switches initiated by the car switch and maintaining a holding circuit for said direction switch upon moving said car switch to neutral position for successive automatic floor car stopping control, adapting the car switch to be moved to its off position as soon as the motor has attained its driving speed upon the car leaving a floor for stopping at a next succeeding floor, resistances for controlling the acceleration and deceleration of said driving means in step reducing degrees, relays for controlling said resistances initiated upon moving the car switch to an active position, a controller operated by and in synchronism with the car for sequentially controlling said resistance controlling relays, and for maintaining a holding circuit for either of said direction switches when active after a first step deceleration of motor and for a stopping control of the car deenergizing the active direction switch, said controlling means constituting a pair of adjoiningly arranged relative different lengths rotatable feed advanced contacts, and a series of stationary contacts arranged in a sequential order upon a spiral support, one set of stationary contacts for each floor served.

ARTHUR J. LIEBENBERG.